Patented Mar. 29, 1949

2,465,803

UNITED STATES PATENT OFFICE 2,465,803

BETA-NITROALKANE SULFONIC ACIDS

Royden Lewis Heath and Henry Alfred Piggott, Blackley, Manchester, England, assignors to Imperial Chemical Industries Limited, a corporation of Great Britain No Drawing. Application January 2, 1945, Serial No. 571,120. In Great Britain February 12, 1944

5 Claims. (Cl. 260—513)

This invention relates to the manufacture of new nitroalkane sulphonic acids and more particularly it relates to the manufacture of salts of β-nitroalkane sulphonic acids.

According to the invention salts of β-nitroalkane sulphonic acids are manufactured by a process which comprises interacting a $\Delta^\alpha$-nitro-olefine of the formula CRR'=CR"NO$_2$ wherein R, R' and R" may be hydrogen or hydrocarbon radicals and either R or R' with R" may together form part of a cycloaliphatic ring, with a water-soluble sulphite or bisulphite.

$\Delta^\alpha$-Nitro-olefines which may be used in the process of the invention include nitroethylene, 1-nitropropene, 2-nitropropene, 2-nitro-2-butene, 1-nitro-2-methyl-1-propene, 1-nitro-2-phenylethylene, and 1-nitrocyclohexene, 1-nitro-1-methyl-2-phenylethylene, 2-nitro-4-methyl-2-pentene. The free acid may be obtained in conventional manner from the salt by acidification.

Besides the $\Delta^\alpha$-nitro-olefines there may also be used substances which, under the conditions of the reaction, readily give rise to $\Delta^\alpha$-nitro-olefines. These include esters of the alcohols which may be conceived as formed by hydration of the $\Delta^\alpha$-nitro-olefines, viz., alcohols of the formula HOCRR'—CHR"NO$_2$, wherein R, R' and R" have the significance given above. Such esters may be esters of organic acids, for example acetic acid, or of mineral acids, for example of hydrochloric acid or nitric acid. Thus there may be used for example 2-nitropropanol acetate and β-nitroethyl nitrate.

Water-soluble sulphites or bisulphites which may be used in the process of the invention include the alkali metal sulphites or bisulphites, for example sodium sulphite or sodium bisulphite and potassium sulphite or potassium bisulphite, ammonium sulphite or ammonium bisulphite and calcium bisulphite.

The reaction is conveniently carried out in aqueous medium which may be water or a mixture of water and another water-miscible solvent for example methanol or dioxan. The $\Delta^\alpha$-nitro-olefine may for example be added to an aqueous solution of the water-soluble bisulphite when the reaction frequently proceeds spontaneously and may, if necessary, be kept in control by external cooling. When the reaction is complete the salt of the β-nitroalkane sulphonic acid may be isolated by evaporation and purified if desired by recrystallisation.

The β-nitroalkane sulphonic acids so obtained in the form of their salts are a new class of highly reactive substances. They are useful in the manufacture of intermediates for the manufacture of substances of use in the dyestuffs and textile industries. Thus for example they may be reduced by conventional methods to give the corresponding aminoalkane sulphonic acids or their salts and it is a further feature of the invention so to reduce them. The β-aminoalkane sulphonic acid may be obtained from its salts by acidification. The reduction process may be carried out on the isolated salt of the β-nitroalkane sulphonic acid, or, if desired, it may be carried out on the aqueous reaction solution resulting from interaction of the $\Delta^\alpha$-nitro-olefine and the aqueous solution of a water-soluble bisulphite without isolating the salt of the β-nitroalkane sulphonic acid.

The invention is illustrated but not limited by the following examples in which the parts are by weight:

Example 1

10.4 parts of sodium bisulphite are dissolved in 20 parts of water and the solution is cooled to —5° to 0° C. 7.3 parts of nitroethylene are then added dropwise to the vigorously stirred, cold solution, the temperature during the addition being kept below 0° C. After the addition of the nitroethylene is complete stirring is continued for 1 hour at 0° C. and then for a further 4 hours at room temperature. The solution is then evaporated to dryness at 40° C. under reduced pressure. The crystalline residue of sodium β-nitroethane sulphonate may be recrystallised from water. When reduced by means of hydrogen, in aqueous solution in presence of Raney nickel, at atmospheric pressure and at room temperature it is converted into the sodium salt of taurine from which, by treatment with hydrochloric acid and evaporation taurine may be isolated.

Example 2

To a vigorously stirred solution of 20.8 parts of sodium bisulphite in 40 parts of water kept by external cooling between at —10° to —5° C. 17.4 parts of 1-nitropropene are added slowly, the temperature being kept below —5° C. When this addition is complete the mixture is stirred between —10° C. and —5° C. for 2 hours and then at 20° C. for a further 16 hours. The aqueous solution is then evaporated to dryness at 40° C. under reduced pressure. The residue is extracted with hot ethanol and the extract is cooled to about 25° C., filtered, and the filtrate is evaporated to dryness at 40° C. under reduced pressure. The residue consists of sodium 1-nitropropane-2-sulphonate. It may be converted into the p-toluidine salt, M. P. 164-166° C., by treatment of its aqueous solution with a solution of p-toluidine hydrochloride.

Example 3

20.8 parts of sodium bisulphite are dissolved in 60 parts of water and the solution maintained at 30° C. 16.3 parts of 1-nitro-1-methyl-2-phenylethylene dissolved in 60 parts of dioxan are then added dropwise to the vigorously stirred solution, the temperature during the addition being kept at 30° to 35° C. After the addition of the 1-nitro-1-methyl-2-phenylethylene is complete, stirring is continued for 16 hours at 30° C. to 35° C. The solution is then evaporated to dryness at 40° C. under reduced pressure and the residue is extracted with hot ethanol. The ethanol extract is evaporated to dryness at 40° C. The residue consists of sodium 1-nitro-1-methyl-2-phenylethane-2-sulphonate.

Example 4

To a vigorously stired solution of 31.1 parts of sodium bisulphite in 100 parts of water kept by external cooling between —10° C. and —5° C., 26 parts of 2-nitropropene are added dropwise the temperature being kept below —5° C. When this addition is complete the mixture is stirred at —5° C. to 0° C. for 2 hours and then at 20° C. for a further 16 hours. The solution is filtered if necessary and evaporated to dryness at 40° C. under reduced pressure. The residue is extracted several times with hot ethanol, from which solution, after concentration there is obtained sodium-2-nitropropane-1-sulphonate in crystalline form. Reduction of this substance by means of hydrogen, at atmospheric pressure and at room temperature, gives the sodium salt of 2-aminopropane-1-sulphonic acid from which by treatment with hydrochloric acid and evaporation, 2-aminopropane-1-sulphonic acid may be isolated.

Example 5

28.7 parts of sodium bisulphite are dissolved in 60 parts of water and the solution is cooled to between —0° C. and —5° C. 27.8 parts of 2-nitro-2-butene are then added dropwise to the vigorously stirred solution, the temperature during the addition being kept below —5° C. When the addition is complete the mixture is stirred at —10° C. to —5° C. for 4 hours and then at 20° C. for a further 20 hours. The solution is then evaporated to dryness at 40° C. under reduced pressure. The residue is extracted with hot ethanol and the extract is evaporated to dryness at 40° C. under reduced pressure. The residue consists of sodium-2-nitrobutane-3-sulphonate and may be recrystallised from methanol. Reduction by means of hydrogen in aqueous solution in the presence of Raney nickel at room temperature gives the sodium salt of 2-nitrobutane-3-sulphonic acid from which by treatment with hydrochloric acid and evaporation 2-aminobutane-3-sulphonic acid may be isolated.

Example 6

23 parts of sodium bisulphite are dissolved in 40 parts of water and the solution is cooled to —10° C. to 0° C. 13.6 parts of β-nitroethyl nitrate are then added dropwise to the vigorously stirred solution, the temperature during the addition being kept below 0° C. After the addition of the β-nitroethyl nitrate is complete stirring is continued for 4 hours at 0° C. and then for a further 20 hours at 22° C. The solution is evaporated to dryness at 40° C. under reduced pressure. The sodium salt of β-nitroethane sulphonic acid is extracted from the residue with hot ethanol.

Example 7

To a vigorously stirred solution of 20.8 parts of sodium bisulphite in 50 parts of water kept at 35° C. 7.35 parts of 2-nitropropanol acetate are added slowly. After the addition of the 2-nitropropanol acetate is complete stirring is continued for 16 hours at 35° C. The solution is evaporated to dryness at 40° C. under reduced pressure and the residue is extracted with hot ethanol. The extract is evaporated to dryness under reduced pressure and the residue is reduced by means of hydrogen, in aqueous solution in the presence of Raney nickel, at atmospheric pressure and at room temperature. Treatment of the product with hydrochloric acid gives 2-amino-propane-1-sulphonic acid.

Example 8

23.1 parts of sodium bisulphite are dissolved in 60 parts of water and the solution is cooled to —5° to 0° C. 20.2 parts of 1-nitro-2-methyl-1-propene are then added dropwise to the vigorously stirred, cold solution, the temperature during the addition being kept below 0° C. After the addition of the 1-nitro-2-methyl-1-propene is complete, stirring is continued for 2 hours at —5° C. to 0° C. and then for a further 16 hours at room temperature. The aqueous solution is then evaporated to dryness at 40° C. and the crystalline residue is recrystallised from ethanol. When reduced with hydrogen in aqueous solution in the presence of Raney nickel, at atmospheric pressure and at room temperature, it is converted into the sodium salt of 1-amino-2-methylpropane-2-sulphonic acid from which, by treatment with hydrochloric acid and evaporation 1-amino-2-methylpropane-2-sulphonic acid may be isolated.

Example 9

24 parts of sodium bisulphite are dissolved in a mixture of 100 parts of water and 35 parts of methanol and the solution is kept at 30° C. 12.9 parts of 2-nitro-4-methyl-2-pentene are dissolved in 35 parts of methanol and this solution is added slowly to the vigorously stirred solution of sodium bisulphite. The temperature during the addition is kept between 30° C. and 35° C. After the addition is complete stirring is continued for 16 hours at 30° C. The aqueous solution is then evaporated to dryness at 40° C. under reduced pressure. The residue is extracted with hot ethanol and the extract is evaporated to dryness at 40° C. under reduced pressure. The residue consists of sodium-2-nitro-4-methyl-pentane-3-sulphonate, which on reduction with hydrogen, in aqueous solution in the presence of Raney nickel, at room temperature and between 1 and 100 atmospheres pressure is converted into the sodium salt of 2-amino-4-methylpentane-3-sulphonic acid from which, by treatment with hydrochloric acid and evaporation 2-amino-4-methyl pentane-3-sulphonic acid may be isolated.

Example 10

To a vigorously stirred solution of 24 parts of sodium bisulphite in a mixture of 100 parts of water and 30 parts of methanol kept at 30° C. 12.7 parts of 1-nitrocyclohexene in 30 parts of methanol are added slowly, the temperature being kept at 30° C. to 35° C. When this addition is complete the mixture is stirred between 30°

C. and 35° C. for 16 hours. The aqueous solution is evaporated to dryness at 40° C. under reduced pressure. The residue is extracted with hot ethanol and the ethanol extract is evaporated to dryness at 40° C. under reduced pressure. The residue consists of sodium 1-nitro-cyclo-hexane-2-sulphonate.

*Example 11*

25.2 parts of sodium sulphite heptahydrate are dissolved in 20 parts of water and the solution is cooled to between −5° C. and 0° C. 8.7 parts of 1-nitropropene are then added slowly, the temperature being kept below 0° C. When this addition is complete the mixture is stirred between −5° C. and 0° C. for 3 hours and then at 20° C. for a further 16 hours. The solution is evaporated to dryness at 40° C. under reduced pressure. The crystalline residue of disodium 1-aci-nitropropane-2-sulphonic acid is recrystallised from ethanol. When it is reduced by means of hydrogen in aqueous solution in the presence of Raney nickel, at atmospheric pressure and at room temperature, and the resulting product is treated with hydrochloric acid there is obtained 1-aminopropane-2-sulphonic acid.

*Example 12*

To a vigorously stirred solution of 12.0 parts of sodium bisulphite in water at 20° C., 14.9 parts of 1-nitro-2-phenylethylene dissolved in 30 parts of dioxan are added slowly, the temperature being kept at 20° C. When the addition is complete the mixture is stirred between 20° C. and 30° C. for 16 hours. The solution is then evaporated to dryness at 40° C. under reduced pressure. The residue is extracted with hot ethanol and the extract is evaporated to dryness. The residue consists of sodium-1-nitro-2-phenyl ethane-2-sulphonate and may be recrystallised from ethanol. When reduced by means of hydrogen, in aqueous solution in the presence of Raney nickel, at atmospheric pressure and at room temperature it is converted into the sodium salt of 1-amino-2-phenyl ethane-2-sulphonic acid from which, by treatment with hydrochloric acid and evaporation 1-amino-2-phenyl ethane-2-sulphonic acid may be isolated.

We claim:

1. Beta-nitroalkane sulphonic acids of the formula $$CRR'(SO_3H)—CHR''NO_2$$

wherein R is a member of the group consisting of hydrogen, alkyl and aryl radicals and R' and R'' are selected from the group consisting of hydrogen, alkyl and aryl radicals, and alkylene radicals, in which case R', R'' and the carbon atoms attached to the nitro and sulphonic acid groups together form a cycloaliphatic ring.

2. The process for the manufacture of salts of beta-nitroalkane sulphonic acids which comprises interacting with a compound selected from the group consisting of water soluble sulphites and bisulphites, a $\Delta^a$-nitro-olefine of the formula $CRR'=CR''NO_2$, wherein R is a member of the group consisting of hydrogen, alkyl and aryl radicals, and R' and R'' are selected from the group consisting of hydrogen, alkyl and aryl radicals, and alkylene radicals, in which case R', R'' and the carbon atoms linked by the double bond together form a cycloolefinic ring.

3. The process of claim 2 in which the $\Delta^a$-nitro-olefine is formed in the reaction mixture from an ester of an alcohol of the formula $HOCRR'—CHR''NO_2$, wherein R is a member of the group consisting of hydrogen, alkyl and aryl radicals and R' and R'' are selected from the group consisting of hydrogen, alkyl and aryl radicals, and alkylene radicals, in which case R', R'' and the carbon atoms attached to the nitro and hydroxy groups together form a cycloaliphatic ring.

4. Beta-nitroethane sulphonic acid.

5. A beta-nitropropane sulphonic acid.

ROYDEN LEWIS HEATH.
HENRY ALFRED PIGGOTT.

REFERENCES CITED

The following references are of record in the file of this patent:

UNITED STATES PATENTS

| Number | Name | Date |
| --- | --- | --- |
| 1,594,547 | Nelson | Aug. 3, 1926 |
| 1,999,432 | Ulrich | Apr. 30, 1935 |
| 2,103,879 | Ufer | Dec. 28, 1938 |
| 2,170,380 | Holsten | Aug. 22, 1939 |
| 2,265,993 | Beckham | Dec. 16, 1941 |
| 2,363,819 | Von Glahn | Nov. 28, 1944 |

OTHER REFERENCES

Mayo "Chemical Reviews," vol. 27, pp. 394 to 399 (1940).

Beilstein, "Handbuch der Org. Chem.," 4th ed., vol. XI, p. 67.

Kharasch et al, J. Org. Chem., vol. 3 (1938), pages 175–178, 4 pages.